(12) United States Patent
Bermes (10) Patent No.: US 9,259,828 B2
(45) Date of Patent: Feb. 16, 2016

(54) RATCHET STRAP APPARATUS INCLUDING EASILY ATTACHABLE CARGO STRAP

(71) Applicant: Steven P. Bermes, Fort Wayne, IN (US)

(72) Inventor: Steven P. Bermes, Fort Wayne, IN (US)

(*) Notice: Subject to any disclaimer, the term of this patent is extended or adjusted under 35 U.S.C. 154(b) by 293 days.

(21) Appl. No.: 13/674,681

(22) Filed: Nov. 12, 2012

(65) Prior Publication Data

US 2014/0130317 A1 May 15, 2014

(51) Int. Cl.
*B25B 25/00* (2006.01)
*B60P 7/08* (2006.01)

(52) U.S. Cl.
CPC ............... *B25B 25/00* (2013.01); *B60P 7/083* (2013.01); *Y10T 24/2121* (2015.01); *Y10T 24/2175* (2015.01); *Y10T 24/4773* (2015.01)

(58) Field of Classification Search
CPC ...... B60P 7/083; B60P 7/0823; B60P 7/0838; B60P 7/0846; B25B 25/00
USPC ................. 24/69 CT, 68 CD, 197, 68 E, 193, 24/265 BC, 265 CD, 265 R, 69 ST, 909; 254/217, 218, 237, 222, 223; 410/12, 410/100, 103
See application file for complete search history.

(56) References Cited

U.S. PATENT DOCUMENTS

| | | | |
|---|---|---|---|
| 2,710,436 A | 6/1955 | Davis | |
| 3,887,966 A | 6/1975 | Gley | |
| 4,199,182 A | 4/1980 | Sunesson | |
| 4,365,391 A | 12/1982 | Chapalain | |
| 4,395,796 A | 8/1983 | Akaura et al. | |
| 4,641,875 A | 2/1987 | Speich | |
| 6,195,848 B1 | 3/2001 | Jackson et al. | |
| 6,273,353 B1* | 8/2001 | Berger ........................ 242/388.1 |
| 6,547,218 B2 | 4/2003 | Landy | |
| 6,631,537 B1* | 10/2003 | Huang ............................ 24/193 |
| 6,654,987 B1 | 12/2003 | Wu | |
| 7,464,915 B2 | 12/2008 | Liu et al. | |
| 7,651,072 B1* | 1/2010 | Chang .......................... 254/218 |
| 7,712,191 B2 | 5/2010 | Huang | |
| 8,291,552 B2* | 10/2012 | Gopal et al. ............... 24/68 CD |
| 2003/0000047 A1 | 1/2003 | Mamie et al. | |
| 2008/0189921 A1 | 8/2008 | Tomosue | |

OTHER PUBLICATIONS

Written Opinion of the International Searching Authority in related PCT/US2013/069424.

* cited by examiner

*Primary Examiner* — Robert J Sandy
*Assistant Examiner* — Michael Lee
(74) *Attorney, Agent, or Firm* — George Pappas (57) ABSTRACT

A ratchet strap apparatus includes a tensioning strap adapted to be selectively tensioned and a cargo strap adapted to be secured to the apparatus using an inboard pin and an outboard pin and bending the cargo strap into a loop. In one embodiment, the outboard pin is secured to a side wall and an opening is provided between the outboard pin and another side wall whereby the outboard pin may be inserted into a cargo strap loop. In another embodiment, the outboard pin is slidingly received through a hole in one side wall and is selectively unseated from a saddle on the other side wall for insertion into the cargo strap loop. In yet another embodiment, the outboard pin is secured between two side walls and the inboard pin is selectively removable from and seated on saddles in each of the walls whereby the inboard pin extends therebetween.

9 Claims, 11 Drawing Sheets

RATCHET STRAP APPARATUS INCLUDING EASILY ATTACHABLE CARGO STRAP

BACKGROUND OF THE INVENTION

1. Field of the Invention

The present invention relates to the field of ratchet strap apparatus typically used in tying down cargo and other things and for tensioning purposes. More particularly, the present invention relates to an improved ratchet strap apparatus including an easily attachable cargo strap.

2. Background

Ratchet strap apparatus are today commonly used, for example, in tying down cargo and loads on vehicles, trailers, etc., and for tensioning purposes as needed or desired. Ratchet strap apparatus are, for example, shown and described in U.S. Pat. Nos. 7,464,915; 6,654,987; 6,547,218; 6,195,848; and 4,199,182. These apparatus essentially include a mechanism having a wind up drum rotatably mounted between two walls, and a handle engaging and rotatably driving the drum. A flat tensioning strap is selectively wound onto the drum and unwound therefrom. Another flat strap referred to herein as a cargo strap is also secured to the apparatus. The terminal ends of the straps include hooks whereby the strap ends can be hooked onto each other, the cargo/load or parts of the vehicle, trailer, etc. By winding the tension strap onto the drum, the straps are placed in tension and the cargo/load is thereby secured or tension is placed as needed or desired on the components whereat the hooks are affixed.

In most ratchet strap apparatus, the cargo strap is relatively short and is permanently affixed to the ratchet mechanism. The tensioning strap is relatively longer and must be inserted through a slot in the drum, pulled taught and then, by rotatably driving the drum, caused to become wound around the drum and thereby also become frictionally engaged and tensioned. As can be appreciated, it can be difficult to simultaneously hook the cargo strap at a desired location, hook the tensioning strap at another desired location, insert the tensioning strap through the drum slot while maintaining or drawing it taught and then grasping and moving the handle for rotatably driving the drum and tensioning the tension strap.

The ratchet strap apparatus of U.S. Pat. Nos. 6,654,987 and 4,199,182 make the use thereof easier by essentially providing a mechanism that includes an inboard pin and an outboard pin on the ratchet strap apparatus for more easily attaching the cargo strap. The cargo strap is selectively attachable to the mechanism by bending it into a loop with a slack end on one side thereof and a cargo engagement end on the other, locating the outboard pin through the loop and both the slack end and cargo engagement end around the inboard pin. The slack end is sandwiched between the inboard pin and the cargo engagement end whereby tension on the cargo engagement end frictionally secures the slack end between the cargo engagement end and the inboard pin. The tensioning strap may then be wound around the drum using the ratchet handle for tensioning.

However, there remain shortcomings and drawbacks in such ratchet strap apparatus and in the securement of the cargo strap to the mechanism with the inboard and outboard pins, and a need exists for an improved ratchet strap apparatus wherein the cargo strap is relatively more easily selectively attachable to the apparatus using inboard and outboard pins.

SUMMARY OF THE INVENTION

In one form thereof, the present invention is directed to a ratchet strap apparatus including a tensioning strap adapted to be tensioned such as with a wind up drum rotatably mounted between two walls, a handle selectively engaging and rotatably driving the drum and wherein the tensioning strap is adapted to be wound onto the drum and unwound therefrom. An inboard pin and an outboard pin are secured to the apparatus. A cargo strap is selectively attachable to the apparatus by bending into a loop with a slack end on one side thereof and a cargo engagement end on the other, locating the outboard pin through the loop and both the slack end and cargo engagement end around the inboard pin. The slack end is sandwiched between the inboard pin and the cargo engagement end whereby tension on the cargo engagement end frictionally secures the slack end between the cargo engagement end and the inboard pin. The outboard pin is secured to one side wall and extends to a terminal end. An opening is provided between the terminal end and the other side wall. The outboard pin is located through the loop by inserting the terminal end therethrough.

Preferably, a stop member is provided on the outboard pin terminal end projecting beyond an outer surface of the outboard pin and preventing inadvertent withdrawal from the loop while the loop is engaged over and on the outboard pin. A U-shaped member can be provided having a base section and integrally formed first and second legs extending therefrom, whereby the first leg extends between the ratchet strap two walls and forms the inboard pin, the base section is secured to one of the walls and the second leg forms the outboard pin. The U-shaped member base section and the first and second legs, in cross sectional thickness, preferably have a width extending generally longitudinally along the ratchet strap walls and a height extending generally transverse thereto, and wherein the width is greater than the height. Yet more preferably, the two walls can be formed by bending a sheet into a U-shape with the two walls extending from a base portion, whereby a bridge is provided in the base between the walls forming the inboard pin and whereby an arm is provided in the base extending from one of the walls and forming the outboard pin. Between the bridge and arm, the one wall and part of the base portion can form an L-shaped beam for supporting the arm.

In another form thereof, the present invention is directed to a ratchet strap apparatus including a tensioning strap adapted to be tensioned such as with a wind up drum rotatably mounted between two walls, a handle selectively engaging and rotatably driving the drum and wherein the tensioning strap is adapted to be wound onto the drum and unwound therefrom. An inboard pin and an outboard pin are secured to the apparatus. A cargo strap is selectively attachable to the apparatus by bending into a loop with a slack end on one side thereof and a cargo engagement end on the other, locating the outboard pin through the loop and both the slack end and cargo engagement end around the inboard pin with the slack end being sandwiched between the inboard pin and the cargo engagement end. Tension on the cargo engagement end frictionally secures the slack end between the cargo engagement end and the inboard pin. The outboard pin is secured between the side walls. The side walls are each provided with a saddle whereon the inboard pin is selectively seated extending between the side walls. The cargo strap is selectively attachable to the apparatus by wrapping around the outboard pin and thereby bending into a loop and locating the outboard pin through the loop, and placing the inboard pin on the side walls saddles with the slack end and cargo engagement end therearound. Preferably, stop members are provided on the inboard pin terminal ends projecting beyond an outer surface of the inboard pin for engaging the side walls and preventing undesirable axial sliding of the inboard pin while the cargo strap slack end and engagement end extend therearound.

In yet another form thereof, the present invention is directed to a ratchet strap apparatus including a tensioning strap adapted to be tensioned such as with a wind up drum rotatably mounted between two walls, a handle selectively engaging and rotatably driving the drum and wherein the tensioning strap is adapted to be wound onto the drum and unwound therefrom. An inboard pin and an outboard pin are secured to the apparatus. A cargo strap is selectively attachable to the apparatus by bending into a loop with a slack end on one side thereof and a cargo engagement end on the other, locating the outboard pin through the loop and both the slack end and cargo engagement end around the inboard pin. The slack end is sandwiched between the inboard pin and the cargo engagement end whereby tension on the cargo engagement end frictionally secures the slack end between the cargo engagement end and the inboard pin. The outboard pin is selectively fixedly secured to one of the side walls. The other of the side walls includes a saddle whereon the outboard pin is selectively seated. The outboard pin is located through the loop by removing the outboard pin from the saddle, inserting a terminal end thereof through the loop and placing the outboard pin on the saddle.

Preferably, the selective fixed securement comprises an opening through the one side wall wherethrough the outboard pin is slidingly received and whereby, when the outboard pin is removed from the saddle, the outboard pin is selectively slidable through the opening. Stop members may be provided on the outboard pin terminal ends projecting beyond an outer surface of the outboard pin for engaging the side walls and preventing undesirable axial sliding of the outboard pin and preventing inadvertent withdrawal from the loop while the loop is engaged over and on the outboard pin.

In yet a further form thereof, the present invention is directed to a ratchet strap apparatus including a tensioning strap adapted to be tensioned such as with a wind up drum rotatably mounted between two walls, a handle selectively engaging and rotatably driving the drum and wherein the tensioning strap is adapted to be wound onto the drum and unwound therefrom. An inboard pin and an outboard pin are secured to the apparatus. A cargo strap is selectively attachable to the apparatus by bending into a loop with a slack end on one side thereof and a cargo engagement end on the other, locating the outboard pin through the loop and both the slack end and cargo engagement end around the inboard pin, the slack end being sandwiched between the inboard pin and the cargo engagement end whereby tension on the cargo engagement end frictionally secures the slack end between the cargo engagement end and the inboard pin. An opening is provided through one side wall wherethrough the outboard pin is slidingly received. The other of the side walls includes a saddle whereon the outboard pin is selectively seated. The outboard pin is located through the loop by removing the outboard pin from the saddle, inserting a terminal end thereof through the loop and placing the outboard pin on the saddle.

Preferably, stop members are provided on the outboard pin terminal ends projecting beyond an outer surface of the outboard pin for engaging the side walls and preventing undesirable axial sliding of the outboard pin and preventing inadvertent withdrawal from the loop while the loop is engaged over and on the outboard pin. The two walls may be formed by bending a sheet into a U-shape with the two walls extending from a base portion and whereby a bridge is provided in the base between the walls forming the inboard pin. An edge of the bridge is preferably bent over and forms a rounded surface whereat the slack end and cargo engagement end extend therearound. An edge of each of the side walls can be bent forming an L-shaped structural beam.

BRIEF DESCRIPTION OF THE DRAWINGS

The above mentioned and other features of this invention, and the manner of attaining them, will become more apparent and the invention itself will be better understood by reference to the following description of the embodiments of the invention taken in conjunction with the accompanying drawings, wherein.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

Figure 1:
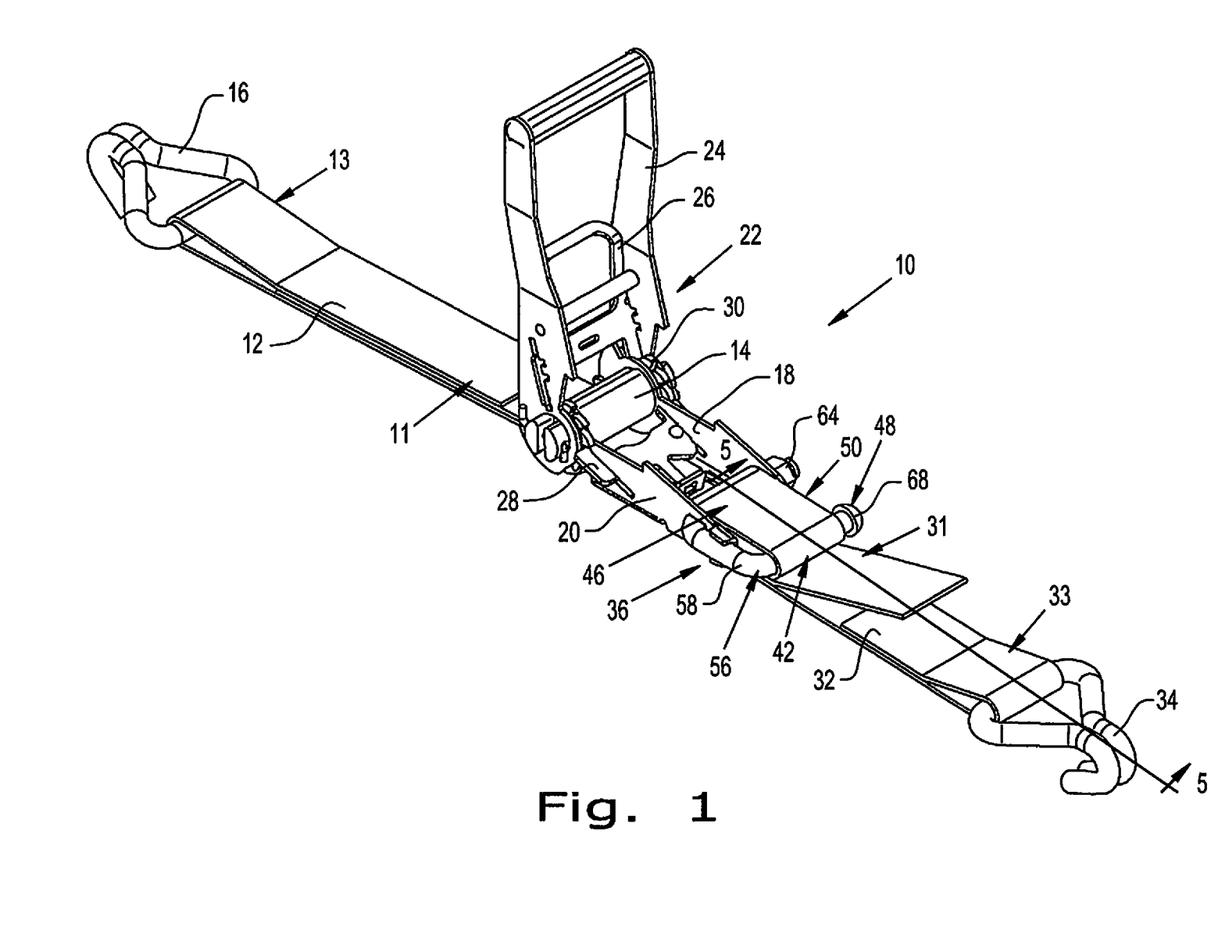
FIG. 1 is a perspective view of a ratchet strap apparatus constructed in accordance with the principles of the present invention.

Referring initially to FIG. 1, a ratchet strap apparatus constructed in accordance with the principles of the present invention is shown and generally designated by the numeral 10. Ratchet strap apparatus 10 includes a tensioning strap 12 having one end 11 secured to and adapted to be wound onto and unwound from a wind up drum 14. The terminal end 13 of tensioning strap 12 is provided with a steel hook 16. Tensioning strap 12 is generally flat and is made of nylon or other known and customary suitable material.

A cargo strap 32 is also provided and, at its terminal end 33, is provided with a steel hook 34. At its other end 31, cargo strap 32 is selectively attachable to the ratchet strap apparatus 10 with an attachment mechanism 36 as described herein below. Cargo strap 32 is similarly generally flat and is made of nylon or other known and customary suitable material.

Wind up drum 14 is rotatably mounted between walls 18 and 20. A ratchet mechanism generally designated by the numeral 22, well known to those skilled in the art and which is commonly used in prior ratchet strap apparatus, including a handle 24, release 26, catch 28 and toothed members 30, is provided for selectively winding the tensioning strap 12 onto the wind up drum 14 and for selectively unwinding the tensioning strap 12 therefrom. Accordingly, ratchet strap apparatus 10 may be used by securing the hooks 16, 34 as needed or desired, pulling the cargo strap 32 tight and attaching its end 31 thereto and, using the ratchet mechanism 22, rotatably driving the wind up drum 14 and winding the tensioning strap end 11 onto the wind up drum 14 for thereby tensioning the straps 12, 32. The tension is released using the ratchet mechanism 22 and rotatably driving the wind up drum 14 in the opposite direction and unwinding the strap 12. The end 31 of the cargo strap 32 is then detached therefrom.

Figure 5:
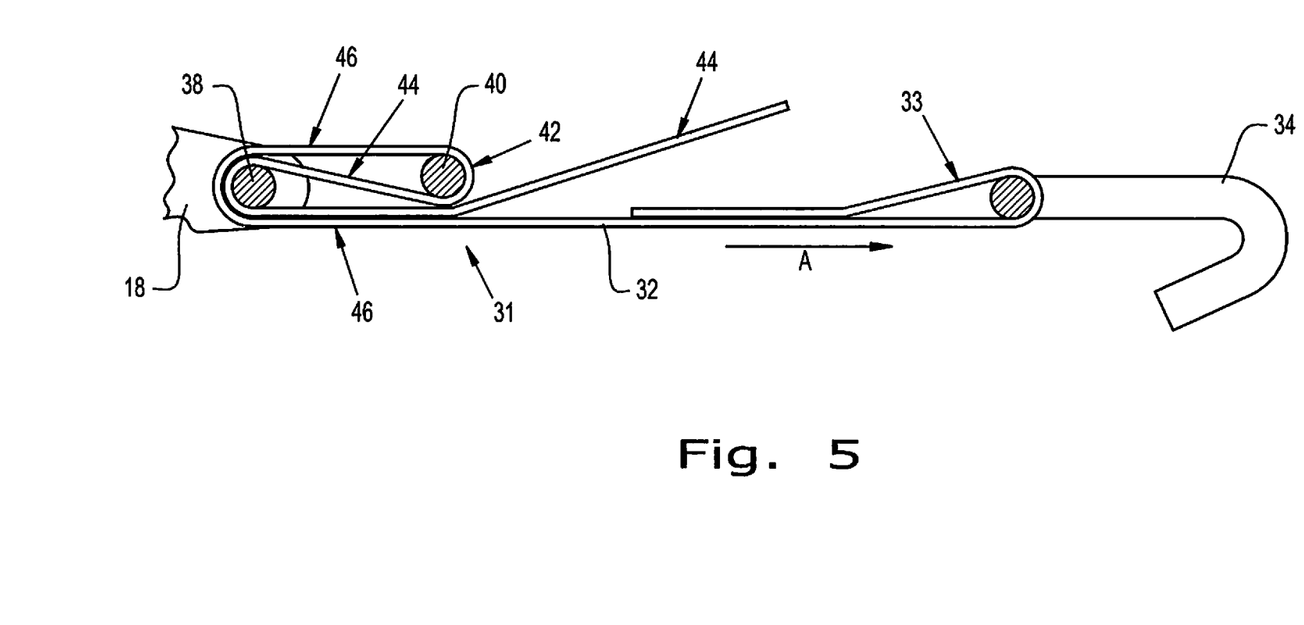
FIG. 5 is a cross sectional view taken along line 5-5 of FIG. 1.
Figure 12:
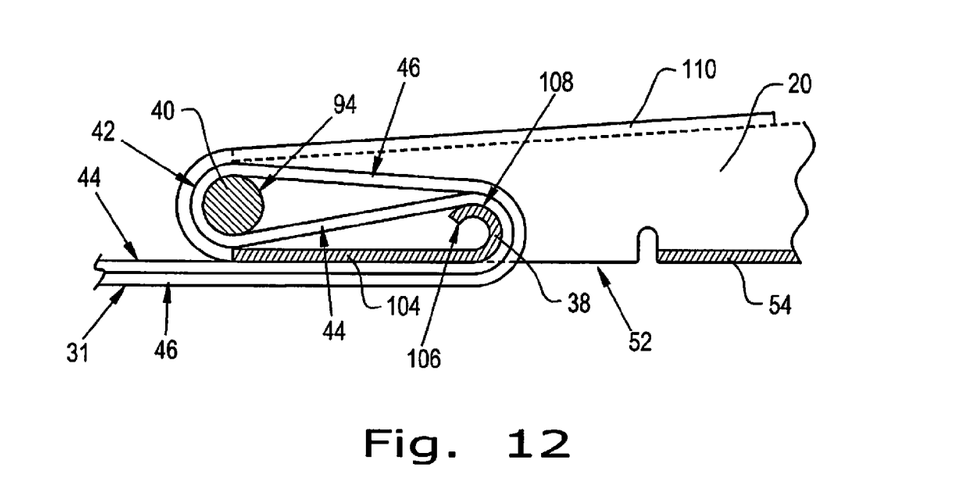
FIG. 12 is a cross sectional view taken along line 12-12 of FIG. 11 and further showing the outboard pin and the cargo strap attached to the attachment mechanism.

The cargo strap end 31 is selectively attachable to the apparatus 10 with an attachment mechanism generally designated by the numeral 36. Attachment mechanism 36 includes an inboard pin 38 and an outboard pin 40 secured to the apparatus 10. As best seen in FIGS. 5 and 12, the cargo strap end 31 is attachable to the apparatus 10 by bending into a loop 42 defining a slack end 44 on one side thereof and a cargo engagement end 46 on the other side thereof. The loop 42 is placed over and extends around the outboard pin 40 and both the slack end 44 and the engagement end 46 are placed over and extend around the inboard pin 38. The slack end 44 is placed directly over and in contact with the inboard pin 38. The engagement end 46 is placed directly over the slack end 44 and the inboard pin 38 thereby sandwiching the slack end 44 between the inboard pin 38 and the engagement end 46. As cargo strap 32 is pulled away from the apparatus 10 as indicated by arrow A, the engagement end 46 is placed in tension and frictionally engages the sandwiched slack end 44 around the inboard pin 38. The cargo strap 32 is thereby attached to the apparatus 10. Indeed, as the tension on cargo strap 32 increases the frictional engagement of the sandwiched slack end 44 also increases thereby further securing the attachment of the cargo strap 32 to the apparatus 10.

As can be appreciated, wrapping the cargo strap end 31 around the outboard pin 40 and the inboard pin 38 in the attachment position as described herein above can be cumbersome and time-consuming. To this end, pursuant to the principles of the present invention, the placement of the cargo strap end 31 around the outboard pin 40 and the inboard pin 38 is made substantially easier while maintaining the attachment integrity.

Referring now more particularly to the embodiment shown in FIGS. 1 through 5, the inboard pin 38 is secured to the apparatus 10 between the side walls 18, 20 and the outboard pin 40 is secured to the side wall 20 and extends to a terminal end 48. An opening 50 is thereby defined between the outboard pin 48 and the other side wall 18. An inboard opening 52 is also provided behind the inboard pin 38 and between the sidewalls 18, 20. Accordingly, the cargo strap 32 may be attached to the attachment mechanism 36 by forming a loop 42 which can be inserted through the inboard opening 52 and then locating the outboard pin 40 through the loop 42 by inserting the terminal end 48 therethrough. As should now be appreciated, this is possible because opening 50 allows the loop 42 to be slipped over the terminal end 48 and onto the outboard pin 40.

Figure 2:
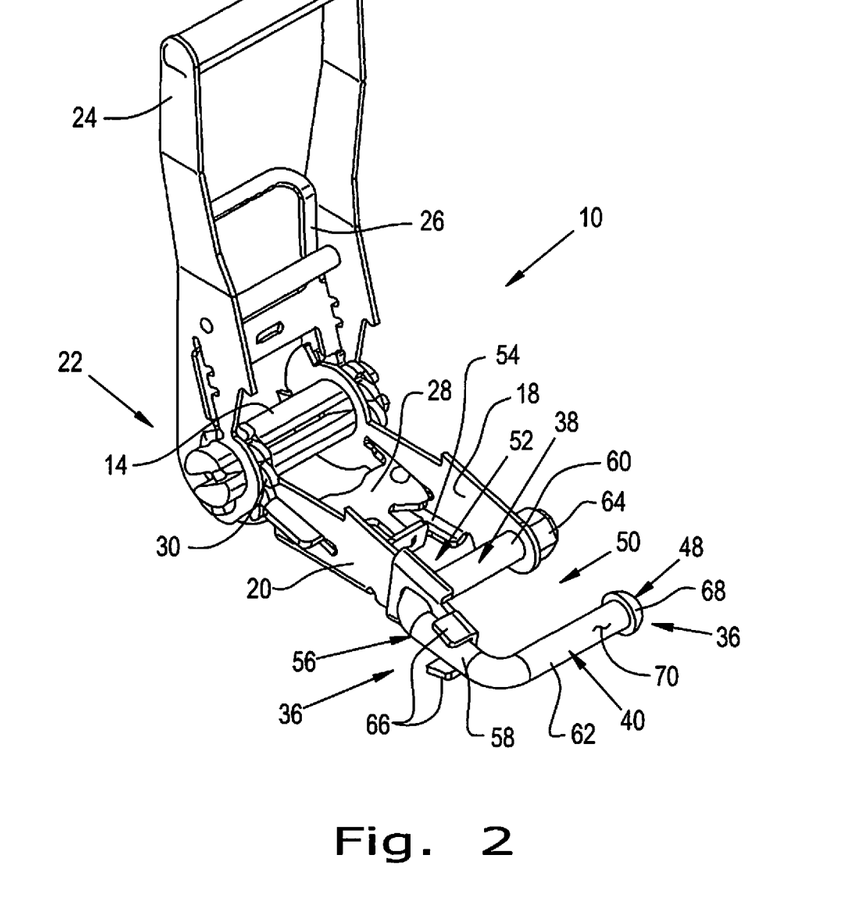
FIG. 2 is a perspective view of the apparatus shown in FIG. 1 with the tensioning strap and cargo strap removed.
Figure 3:
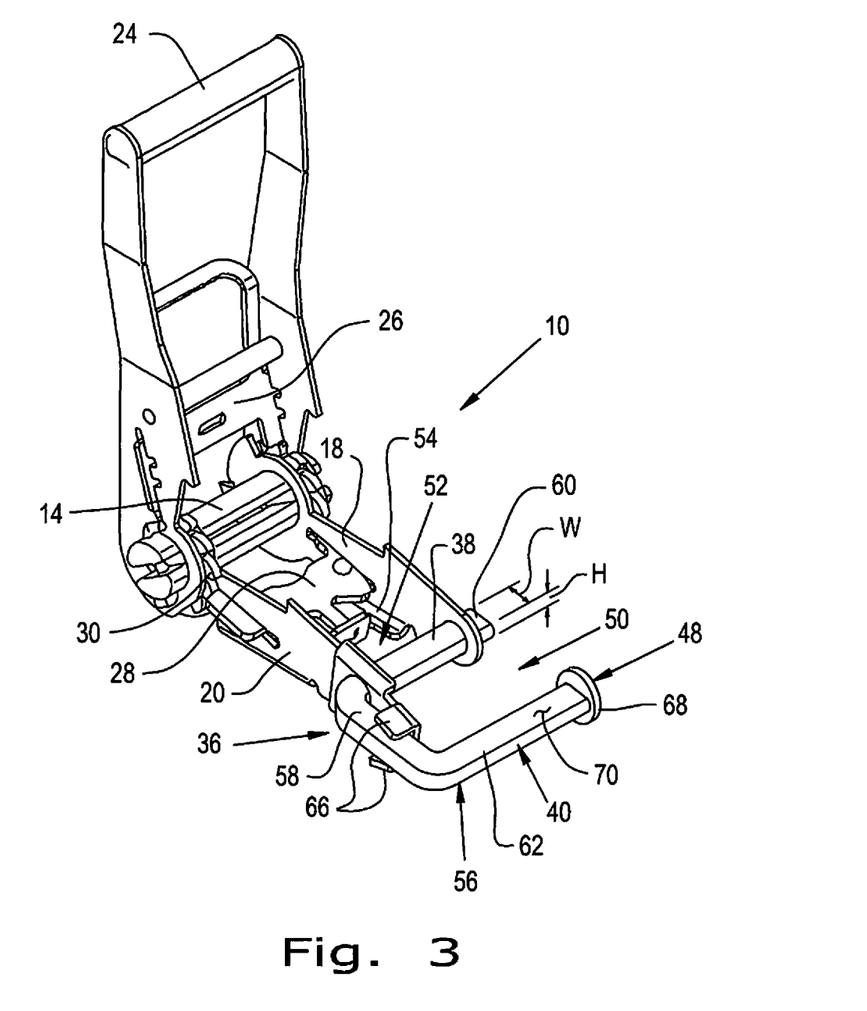
FIG. 3 is a perspective view of an apparatus similar to that shown in FIG. 1 but including an optional U-shaped member forming the inboard and outboard pins.

Preferably, both in this and the other embodiments described herein below, side walls 18, 20 are formed of thick sheet metal, by stamping and bending operations, into a U-shape with a base section/portion 54 and the side walls 18, 20 extending perpendicular therefrom. As best seen in FIGS. 2 and 3, part of the base portion 54 behind the inboard pin 38 is removed for thereby forming the inboard opening 52.

Figure 4:
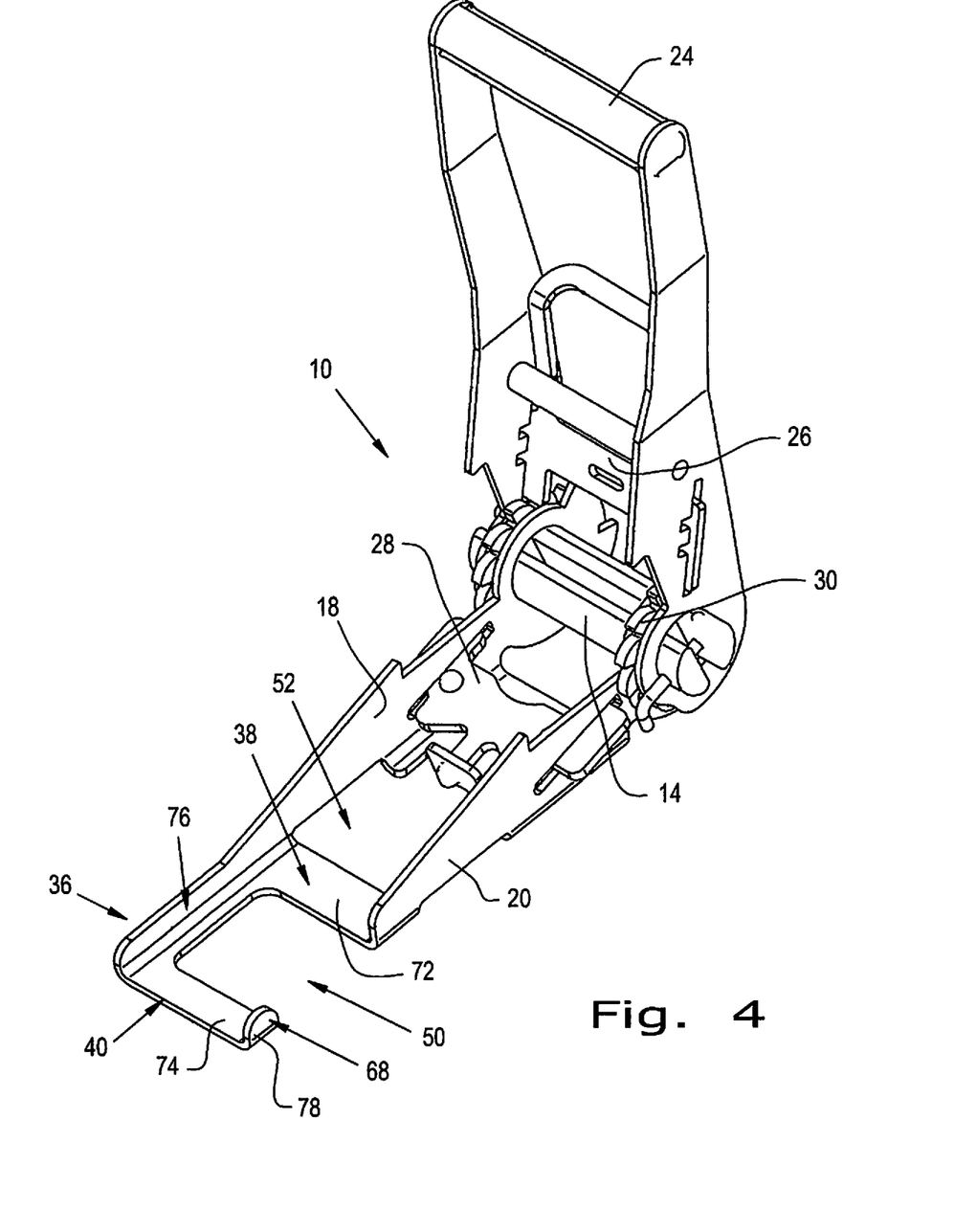
FIG. 4 is a perspective view of a ratchet strap apparatus similar to that of FIG. 1 but wherein the inboard and outboard pins are formed of the sheet metal material also forming the side walls.

In the embodiment shown in FIGS. 2 and 4, a U-shaped member 56 is provided having a base section 58 and integrally formed first leg 60 and second leg 62 extending from the base section 58. The first leg 60 extends through holes in the side walls 18, 20 and is affixed thereto by welding or a threaded nut 64 or other equivalent fastener means, and thereby forms the inboard pin 38. The base section 56 is secured to the side wall 20 by welding and/or bent side wall tabs 66. The second leg 62 extends out from the side wall 20 toward the other side wall 18 and forms the outboard pin 40. A stop member 68 is provided and projects beyond the outer surface 70 of the outboard pin 40 for preventing the inadvertent withdrawal of the loop from the outboard pin 40 when engaged thereover. Yet more preferably, as shown in FIG. 3, the U-shaped member base 58 and legs 60, 62, in cross sectional thickness, have a width W which is greater than their height H. The thicker width W extends generally longitudinally as shown in FIG. 3 along the walls 18, 20 for thereby increasing the strength in the longitudinal direction along the arrow A.

In the embodiment shown in FIG. 4, a bridge 72 is formed and provided by the base section 54 thereof between the side walls 18, 20. The bridge 72 hence serves as the inboard pin 38. An arm 74 if further formed and provided by part of the base section 54 and extending from the side wall 20. The arm 74 hence serves as the outboard pin 40. Between the bridge 72 and the arm 74, wall 20 and part of the base section 58 form an L-shaped beam 76 for rigidly securing the arm 74. Additionally, the outboard pin stop member 68 is formed by bending the terminal end 78 of the arm 74 substantially perpendicular thereto.

Figure 6:
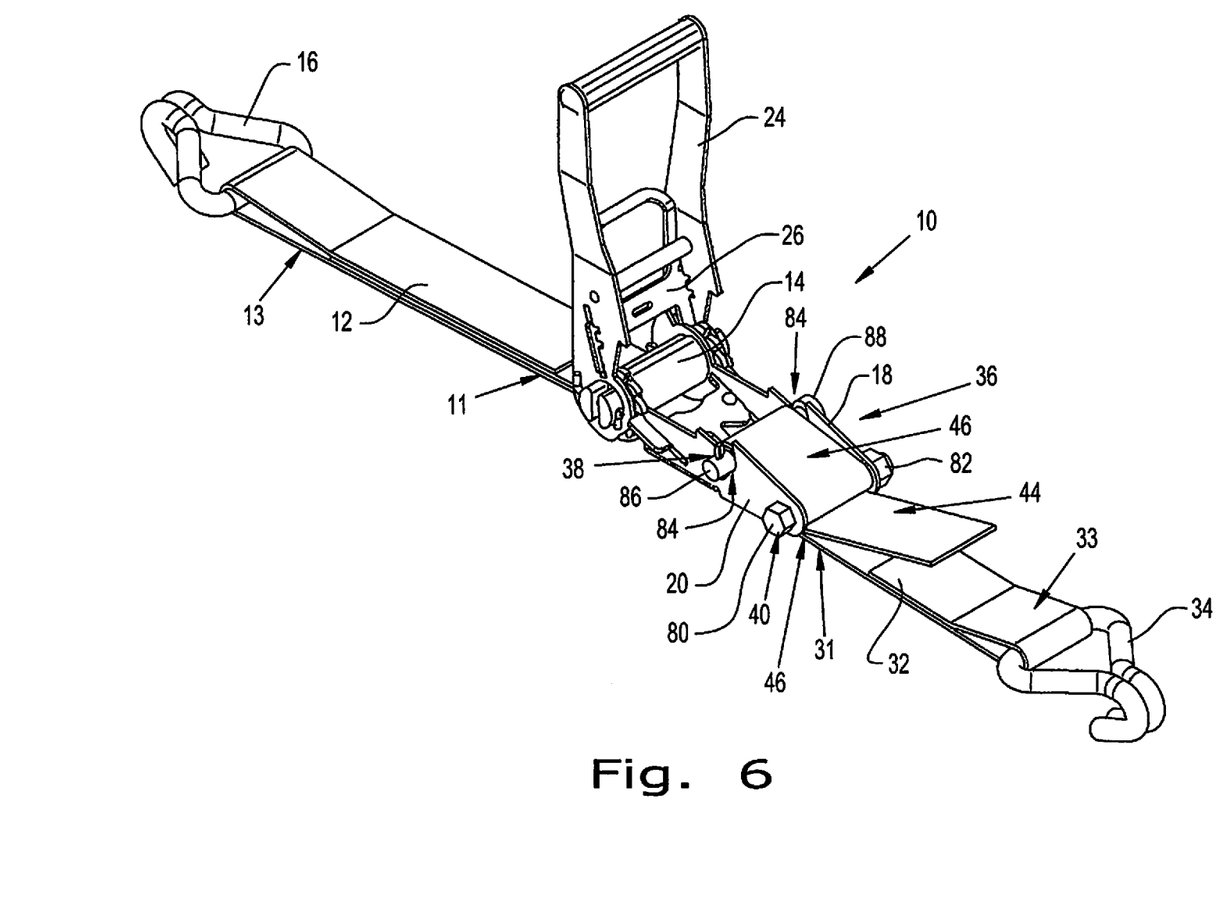
FIG. 6 is a perspective view of another embodiment of a ratchet strap apparatus constructed in accordance with the principles of the present invention.
Figure 7:
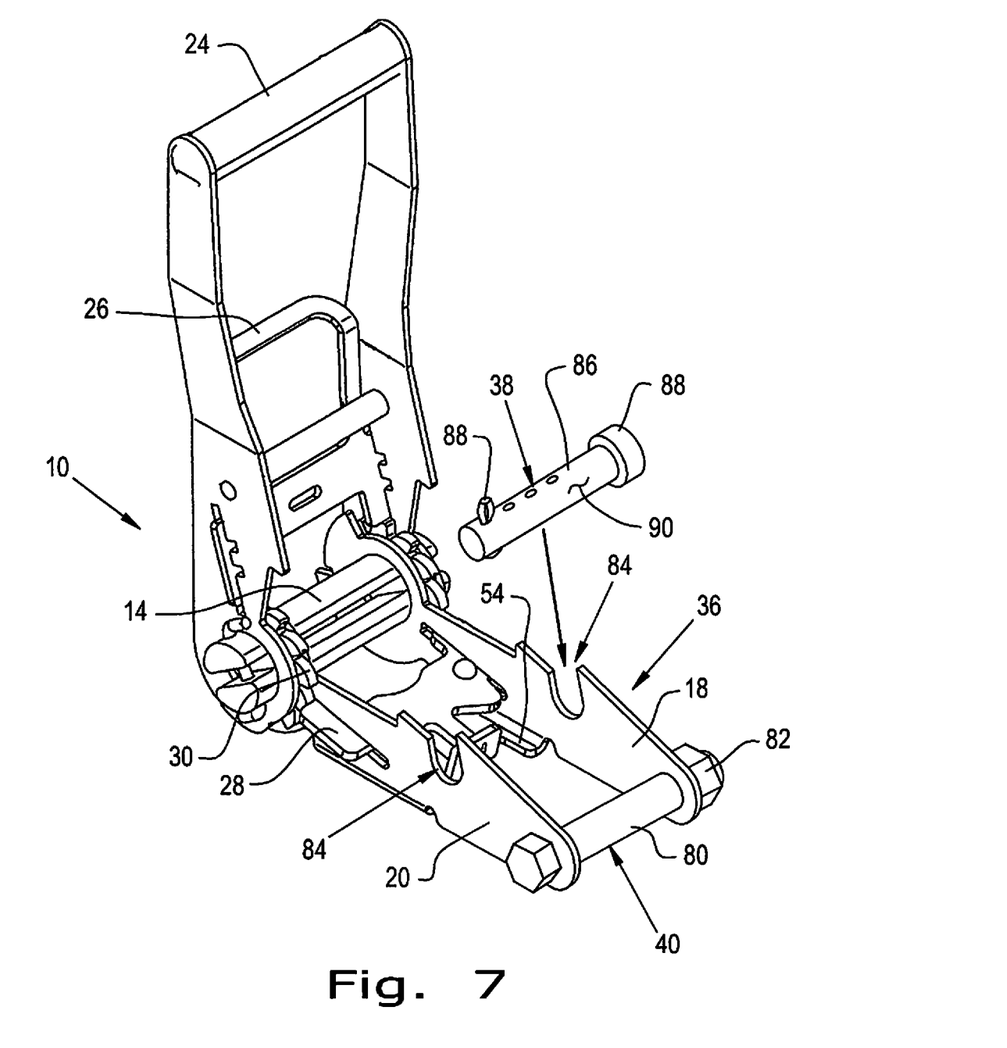
FIG. 7 is a perspective view of the apparatus shown in FIG. 6 with the tensioning strap and cargo strap removed and the inboard pin removed from the side walls saddles.

Turning now to the embodiment of FIGS. 6 and 7, the outboard pin 40 is formed of a bolt or rod 80 secured between the side walls 18, 20 by welding and/or a threaded nut 82. Each of the side walls 18, 20 are formed and provided with a saddle cutout part 84 extending downwardly toward the base section 54 and toward the outboard pin 40. The inboard pin 38 is selectively received and seated in the saddle cutouts 84 and extending between the side walls 18, 20. The inboard pin 38 can be a rod or bolt 86 including stop members 88 on the terminal ends thereof projecting beyond the outer surface 90 of the inboard pin 38. The stop members 88 can, for example, take the form of a head or cotter pin as shown in FIG. 7, so long as they can engage the side walls 18, 20 and prevent axial sliding of the inboard pin 38.

The cargo strap 32 is attached to the attachment mechanism 36 of this embodiment by wrapping the strap end 31 around the outboard pin 40 and thereby bending the cargo strap 32 and forming the loop 42 therearound. After thereby locating the outboard pin 40 through the loop 42, the loop slack end 44 and engagement end 46 are placed adjacent one another and the inboard pin 38 is placed on and seated in the side walls saddles with both the slack end 44 and engagement end 46 extending through the inboard opening 52. Hence, the slack end 44 and engagement end 46 are placed around the inboard pin 38. The tension on the cargo strap 32 in the direction of arrow A creates a force into the saddle cutouts 84 thereby maintaining the inboard pin 38 seated therein. The stop members 88 prevent undesirable axial sliding of the inboard pin 38 while the slack end 44 and engagement end 46 extend therearound.

Referring now to the embodiment of FIGS. 8 through 12, the attachment mechanism inboard pin 38 is formed of a bolt or rod 90 secured between the side walls 18, 20 by extending through respective holes 91, 93 and welding and/or with a threaded nut 92. The inboard opening 52 is thereby similarly formed like the embodiment of FIGS. 1-5, through the base 54 behind the inboard pin 38.

Figure 8:
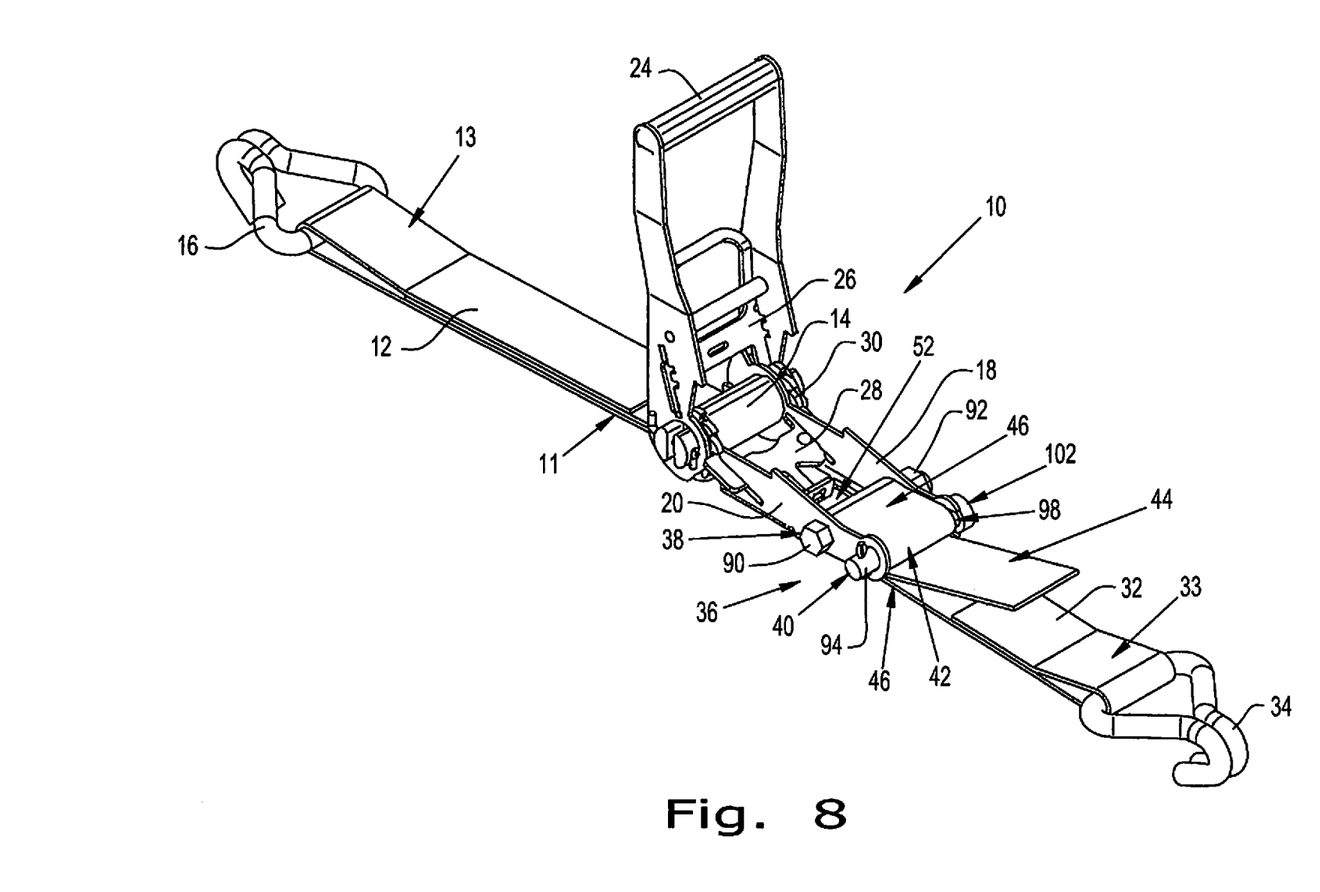
FIG. 8 is a perspective view of another embodiment of a ratchet strap apparatus constructed in accordance with the principles of the present invention.
Figure 9:
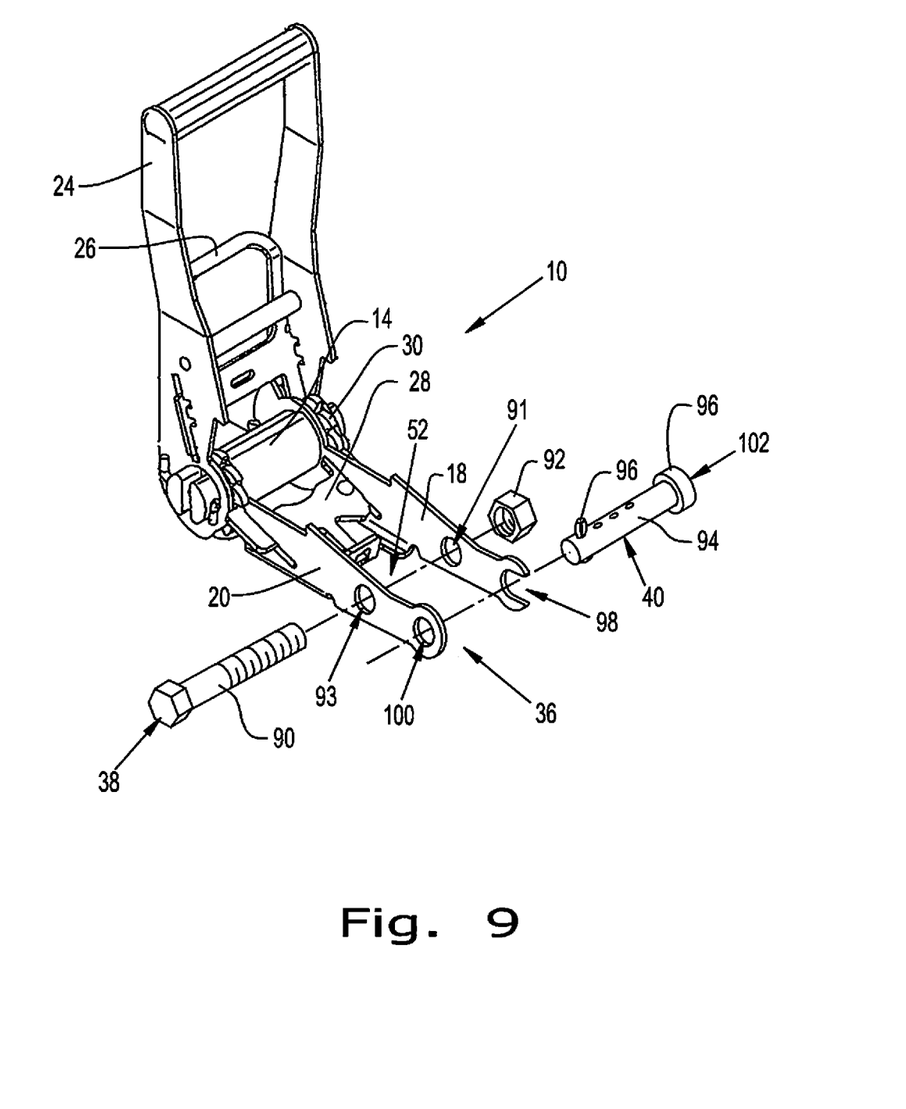
FIG. 9 is a perspective view of the apparatus shown in FIG. 8 with the tensioning strap and cargo strap removed and the inboard and outboard pins in exploded view.

The outboard pin 40 can take the form of a rod or bolt 94 which is similar to rod or bolt 86 and including stop members 96 at each terminal end thereof such as a head or cotter pin. The side wall 18 is provided with a saddle cutout 98 whereon the outboard pin 40 may be selectively seated. The outboard pin 40 in this embodiment is selectively fixedly secured to the side wall 20 such as by a hinge mechanism or a hole/opening 100 slightly larger than the bolt 94 whereby bolt 94 can both axially slide therethrough as well as hingedly pivot in and out of the saddle 98.

Accordingly, by unseating outboard pin 40 from the saddle 98 and/or sliding axially through hole 100, an opening similar to opening 50 of the embodiment of FIGS. 1 through 5 is created between the terminal end 102 of bolt 94 and the side wall 18/saddle 98. The cargo strap end 31 is therefore attached to the attachment mechanism 36 in a similar fashion as that of FIGS. 1 through 5 except that the outboard pin 40 in this embodiment is not fixed to the side wall 20. Rather, it is selectively hingedly movable and axially slidable for yet more easily inserting the terminal end 102 thereof through the loop. Once inserted, the outboard pin 40 is seated in the saddle 98 whereat the tension then placed on the cargo strap 32 places a force on the outboard pin 40 toward and into the saddle 98 for maintaining the outboard pin 40 seated therein. Moreover, the stop members 96 prevent undesirable axial sliding of the outboard pin 40 and prevent inadvertent withdrawal of the outboard pin 40 from the loop 42.

Figure 10:
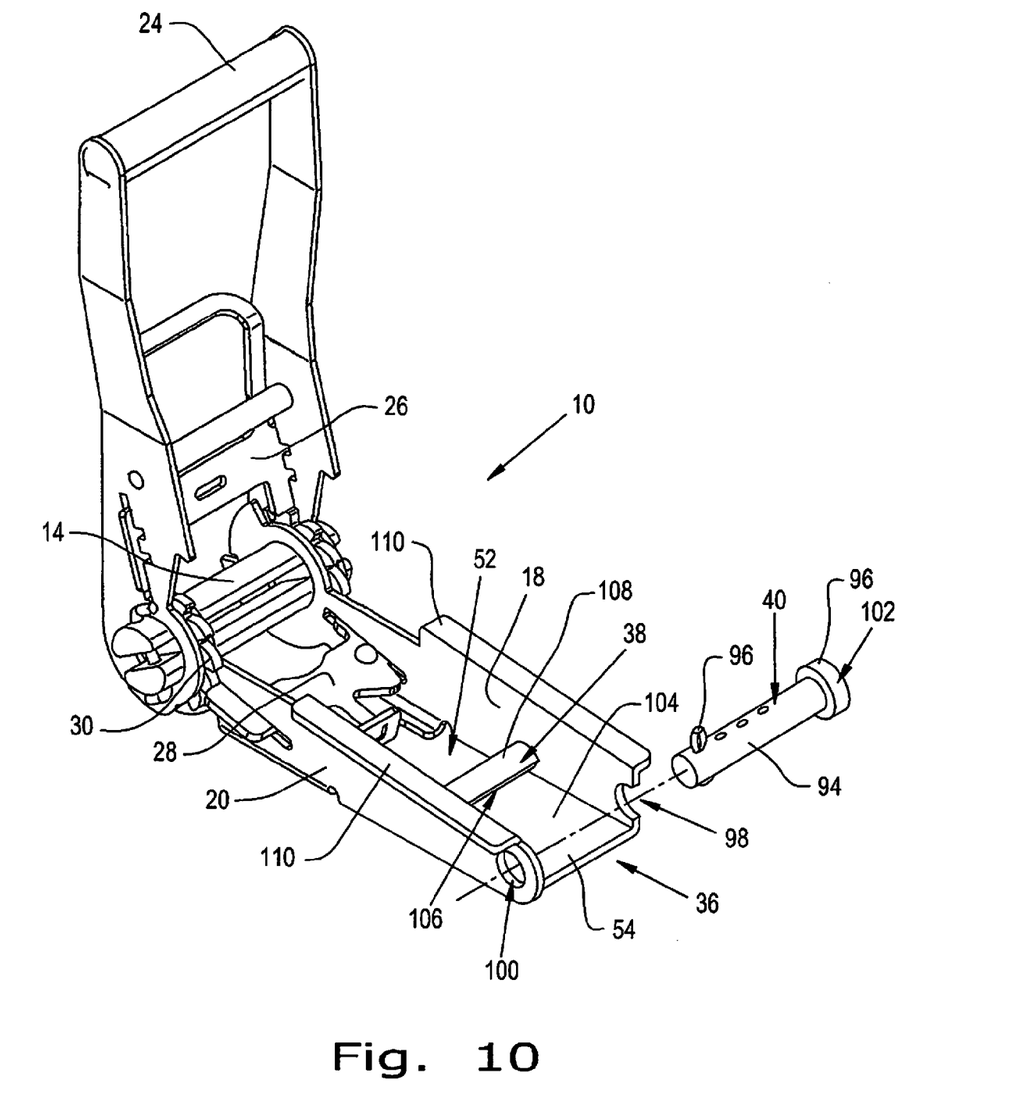
FIG. 10 is a perspective view of a ratchet strap apparatus similar to that of FIG. 8 but wherein the inboard pin is formed of the sheet metal material also forming the side walls.
Figure 11:
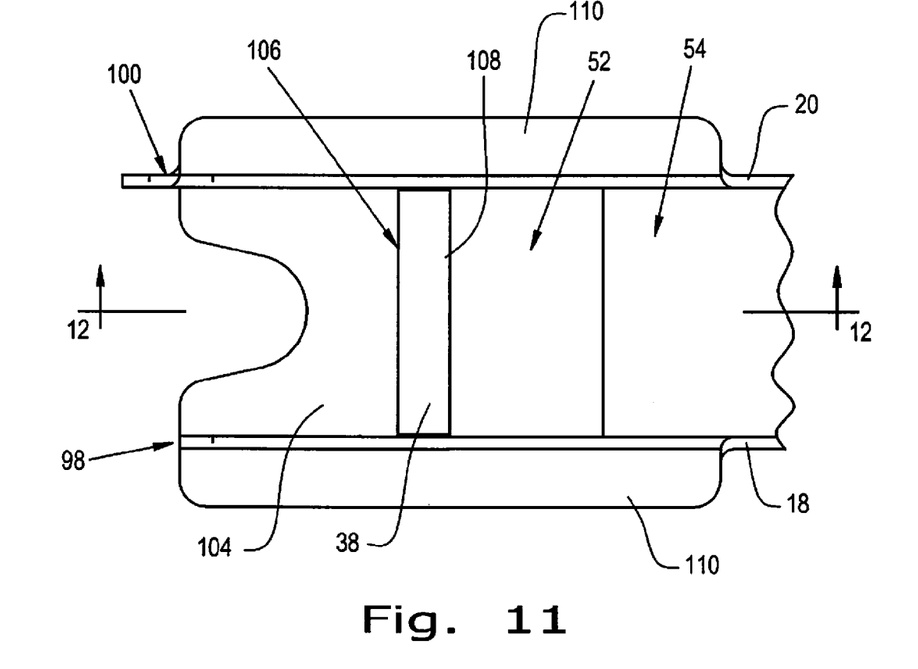
FIG. 11 is a partial top plan view of the apparatus shown in FIG. 10.

In the embodiment of FIGS. 10 through 12, part of the base section/portion 54 extends between the side walls 18, 20 and forms a bridge 104 which thereby forms the inboard pin 38. The rear edge 105 is bent over 180° onto itself and thereby forms a rounded surface 108 serving as the inboard pin 38. The longitudinal upper edges 110 of the side walls 18, 20 are bent outwardly perpendicular to the side walls thereby forming an integral L-shaped structural beam in each of the side walls 18, 20.

While this invention has been described as having an exemplary design, the present invention may be further modified within the spirit and scope of this disclosure. This application is therefore intended to cover any variations, uses, or adaptations of the invention using its general principles.

What is claimed is:

1. A ratchet strap apparatus comprising a tensioning strap adapted to be selectively tensioned, an inboard pin and an outboard pin secured to the apparatus, and a cargo strap selectively attachable to the apparatus by bending into a loop with a slack end on one side thereof and a cargo engagement end on the other, locating the outboard pin through the loop and both the slack end and cargo engagement end around the inboard pin, the slack end being sandwiched between the inboard pin and the cargo engagement end whereby tension on the cargo engagement end frictionally secures the slack end between the cargo engagement end and the inboard pin, wherein:

a hole is provided through a side wall wherein said outboard pin is captured and is axially slidable therein;

another side wall has a saddle whereon said outboard pin is selectively seated; and, the outboard pin is located through the loop by removing the outboard pin from the saddle, inserting a terminal end thereof through the loop and placing the outboard pin on the saddle.

2. The ratchet strap apparatus of claim 1 further comprising stop members on the outboard pin terminal ends projecting beyond an outer surface of said outboard pin for engaging the side walls and preventing undesirable axial sliding of said outboard pin and preventing inadvertent withdrawal from the loop while said loop is engaged over and on the outboard pin.

3. The ratchet apparatus of claim 2 wherein said two walls are formed by bending a sheet into a U-shape with said two walls extending from a base portion and wherein a bridge is provided in the base between said walls forming said inboard pin.

4. The ratchet apparatus of claim 3 wherein an edge of said bridge is bent over and forms a rounded surface whereat the slack end and cargo engagement end extend therearound.

5. The ratchet apparatus of claim 4 wherein an edge of each of said side walls is bent forming an L-shaped structural beam.

6. The ratchet apparatus of claim 1 wherein said two walls are formed by bending a sheet into a U-shape with said two walls extending from a base portion and wherein a bridge is provided in the base between said walls forming said inboard pin.

7. The ratchet apparatus of claim 6 wherein an edge of said bridge is bent over and forms a rounded surface whereat the slack end and cargo engagement end extend therearound.

8. The ratchet apparatus of claim 1 wherein an edge of each of said side walls is bent forming an L-shaped structural beam.

9. The ratchet apparatus of claim 7 wherein an edge of each of said side walls is bent forming an L-shaped structural beam.

* * * * *